US010599757B2

(12) United States Patent
Trese et al.

(10) Patent No.: US 10,599,757 B2
(45) Date of Patent: *Mar. 24, 2020

(54) SYSTEMS, METHODS, AND MEDIA FOR CONTROLLING THE REVIEW OF A DOCUMENT

(71) Applicant: SDL Inc., Wakefield, MA (US)

(72) Inventors: Andrew Trese, Somerville, MA (US); Frank Closset, Sint-Truiden (BE); Laurens van den Oever, Vlaardingen (NL)

(73) Assignee: SDL Inc., Wakefield, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/938,288

(22) Filed: Mar. 28, 2018

(65) Prior Publication Data

US 2018/0217967 A1      Aug. 2, 2018

Related U.S. Application Data

(63) Continuation of application No. 13/217,122, filed on Aug. 24, 2011, now Pat. No. 9,984,054.

(51) Int. Cl.
*G06F 17/00* (2019.01)
*G06F 17/24* (2006.01)
*G06F 17/22* (2006.01)

(52) U.S. Cl.
CPC .......... *G06F 17/24* (2013.01); *G06F 17/2288* (2013.01)

(58) Field of Classification Search
CPC ................................ G06F 16/93; G06F 17/24
See application file for complete search history.

(56) References Cited

U.S. PATENT DOCUMENTS

| | | | |
|---|---|---|---|
| 8,464,148 B1* | 6/2013 | Wichary | G06F 17/2247 715/255 |
| 10,140,320 B2 | 11/2018 | Trese et al. | |
| 2004/0085354 A1* | 5/2004 | Massand | G06F 17/2229 715/751 |
| 2009/0013162 A1* | 1/2009 | Nandan | G06F 8/61 713/1 |
| 2012/0185759 A1* | 7/2012 | Balinsky | G06F 21/6227 715/209 |
| 2019/0042607 A1 | 2/2019 | Trese et al. | |

* cited by examiner

*Primary Examiner* — Andrew T McIntosh
(74) *Attorney, Agent, or Firm* — Carr & Ferrell LLP

(57) ABSTRACT

Systems, methods, and media for controlling the review of documents. Methods may include receiving a request to review a document, responsive to the request, retrieving the document, the document including source content in an extensible markup language format, the document having a read-only access file permission, converting the document to read-write access file permission such that the source content is modifiable, receiving a modification of the source content of the document, incorporating the modification of the source content into the document to create a modified document, and automatically providing the modified document in a displayable format via the web-based interface.

23 Claims, 4 Drawing Sheets

SYSTEMS, METHODS, AND MEDIA FOR CONTROLLING THE REVIEW OF A DOCUMENT

CROSS-REFERENCE TO RELATED DISCLOSURE

This U.S. Nonprovisional Patent Application is a continuation application of U.S. Nonprovisional patent application Ser. No. 13/217,122, filed Aug. 24, 2011, entitled "Web Interface Including the Review and Manipulation of a Web Document and Utilizing Permission Based Control." This U.S. Nonprovisional Patent Application is related to U.S. patent application Ser. No. 13/037,273 filed on Feb. 28, 2011 and titled "Systems, Methods, and Media for Generating Analytical Data." The disclosures of the aforementioned applications are incorporated by reference herein for all purposes, including all references and appendices cited therein.

FIELD OF THE TECHNOLOGY

The present technology relates generally to controlling the review of documents, and more specifically, but not by way of limitation, to systems, methods, and media for controlling the review of a document, for example, within a collaborative document review environment.

BACKGROUND

Informational documents are often created by document authors for a variety of purposes, such as explication of technical information (e.g., user guides, F.A.Q.s, and so forth). The creation of informational documents is often an iterative and review-intensive process. In many instances, the informational document author(s) may create informational documents in a particular format such as portable document format, a word processing format, or other commonly utilized informational document format.

SUMMARY OF THE TECHNOLOGY

According to some embodiments, the present technology is directed to methods for controlling the review of a document. The methods may include: (a) receiving a request to review a document; (b) responsive to the request, retrieving the document, the document having a read-only access file permission; (c) converting the document to read-write access file permission such that the source content is modifiable; (d) receiving a modification of the source content of the document; and (e) incorporating the modification of the source content into the document to create a modified document.

According to additional embodiments, the present disclosure is directed to systems for controlling the review of a document that may include: (a) a memory for storing executable instructions for controlling review of a document; and (b) a processor configured to execute the instructions, the instructions including: (i) a display module that (1) receives requests to review documents that retrieves the document upon the web-based interface receiving a request to review a document, the document including source content in an extensible markup language format, the document having a read-only access file permission and (2) converts the document to read-write access file permission such that the source content is modifiable; and (ii) a review module communicatively coupled with the display module that (1) receives a modification of the source content of the document; and (2) incorporates the modification of the source content into the document to create a modified document.

According to other embodiments, the present disclosure is directed to non-transitory computer readable storage media having a computer program embodied thereon, the computer program executable by a processor in a computing system to perform a method for controlling review of a document, the method comprising: (a) receiving a request to review a document; (b) responsive to the request, retrieving the document, the document having a read-only access file permission; (c) converting the document to read-write access file permission such that the source content is modifiable; (d) receiving a modification of the source content of the document; and (e) incorporating the modification of the source content into the document to create a modified document.

DETAILED DESCRIPTION OF EXEMPLARY EMBODIMENTS

Figure 1:
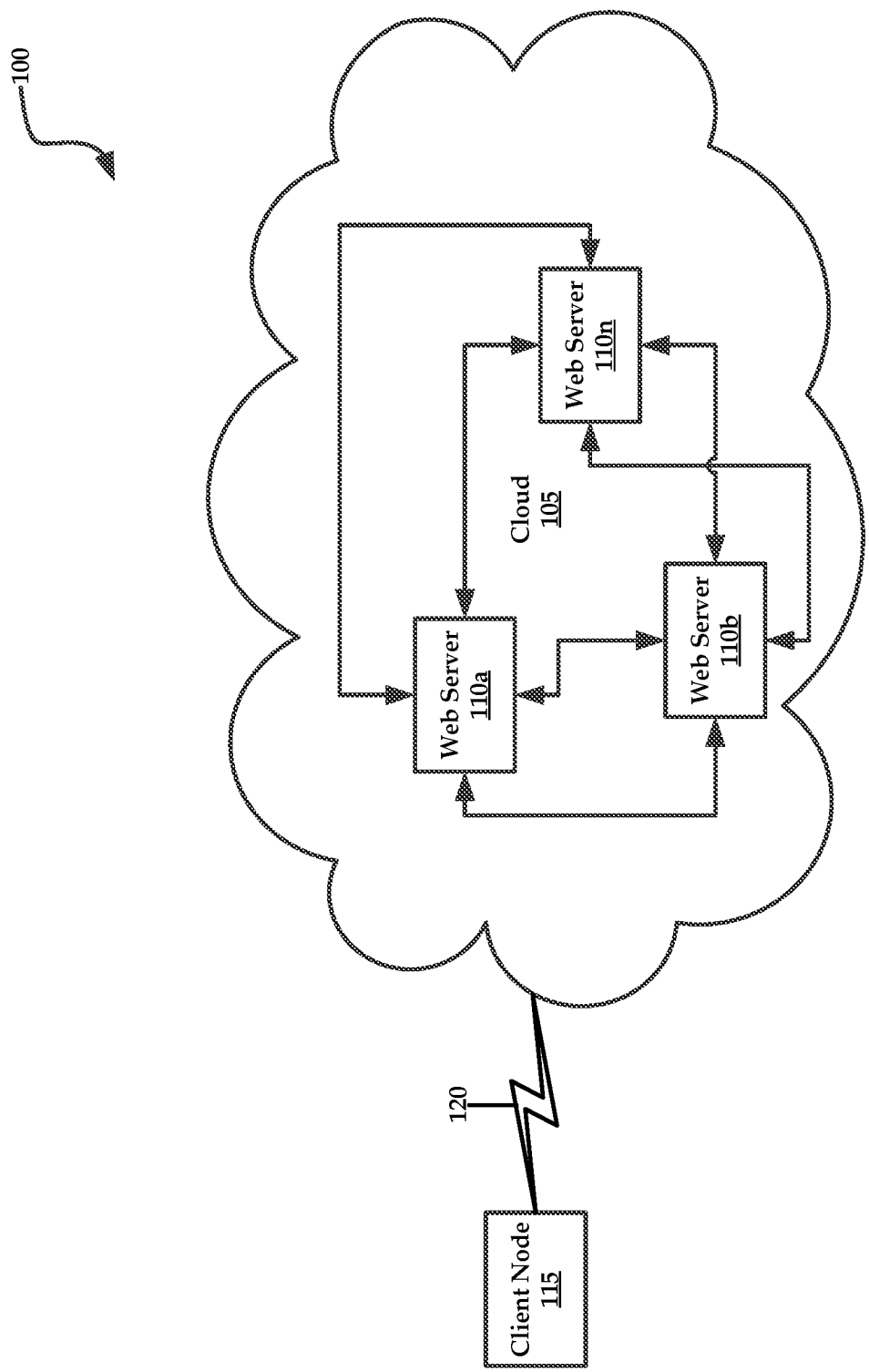
FIG. 1 is a schematic diagram of an exemplary architecture of a system for controlling the review of a document. The system may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Unfortunately, document reviewers (those that are tasked with reviewing and modifying these informational documents) may utilize one or more different document rendering and/or editing programs relative to the document author(s) and/or one another. As such, the review process for informational documents becomes cumbersome, as the informational documents must be converted into a plurality of formats. Additionally, some document rendering programs only allow the end user to view, but not modify the informational document. Therefore, any modification to the informational document must be communicated via a program or process external to those utilized to create the informational document. For example, document reviewers often print out a hard copy of the informational document and interlineate or annotate the informational document. The document reviewer must then provide the interlineated document back to the author(s), where the interlineated information can be incorporated into the document.

This process is only further complicated by a collaborative review process where multiple reviewers independently critique or modify the informational documents. Common problems with collaborative review processes stem from many sources. For example, each of the reviewers may not be aware of the modifications to the informational document being created by the other reviewers, leading to duplicative or confusing modifications to the informational content. Additionally, document author(s) may need to review a plurality of versions of the informational document before they can determine if the modifications are potentially erroneous. These time-consuming and cumbersome steps could be eliminated with the use of a centralized and controlled document review process, as described herein Generally speaking, systems and methods provided herein may be configured to control the review of a document. More specifically, systems and methods provided herein may be configured to provide a controlled, collaborative environment for creating, modifying, and reviewing informational documents. According to some embodiments, systems, methods, and media provided herein may be adapted to control the modification of documents within a collaborative review environment.

The systems may be implemented within a cloud-based computing environment and may include a common web-based interface. Individual client nodes may interact with the systems via the web-based interface utilizing a web browser application. In some applications the system includes a review platform having an extensible language markup ("XML") editor that allows individual or multiple client nodes to modify the source content of informational documents.

It will be understood that while some of the embodiments described herein may contemplate the utilization of XML format documents or applications configured to edit or display XML format documents, one of ordinary skill in the art will appreciate that additional types of document formats (e.g., .pdf, .doc, .txt, .html, .aspx, .xls, and so forth) may also likewise be utilized in accordance with the present technology.

Broadly speaking, the review platform may include a what you see is what you get ("WYSIWYG") web-based interface and XML editor that runs in the web browser of a client node, such as an end user computing system. The XML editor allows document reviewers to modify (e.g., edit, save, delete) the source content of informational documents. These informational documents are stored in XML format and may be rendered to display the source content included in the XML structure.

The XML editor provides the document reviewer with an intuitive interface with which to edit the source content of the informational document without requiring document reviewers to understand XML formatting or XML schemas. Therefore, the XML editor may act similarly to commonly utilized word processing applications. Stated otherwise, the XML editor may provide a centralized and easily accessible environment that allows document authors and reviewers to co-own, create, edit, review, and contribute to the creation of informational documents.

The XML editor may also be configured to apply XML schemas or extensible language markup schema definition ("XSD") to the modified source content to ensure that the modifications conform to the XML schema of the document, ensuring that the informational document remains consistently formatted for publishing.

As modifications are received and checked against the XSD, the modified source content may be displayed as it would look if the modified document were to be published as-is. The modifications may be tracked by including them as tentative changes (subject to third party approval), making the modifications visually distinct from the original source content, for example, by coloring, underlining, or other suitable methods. Therefore, modifications to source content may be easily apprehended by other document reviewers or the content author.

In some embodiments, modifications to informational documents may be subject to collaborative review. For example, one or more client nodes may critique the modifications proposed by other client nodes before the modifications are incorporated into the source content of the informational document. In some embodiments, the review platform may utilize collaborative processes such as crowd-sourcing to improve and refine the source content of informational documents based upon the collective knowledge of consumers or other end users.

Systems and methods provided herein may substantially reduce the need to convert informational documents into a plurality of document formats (because client nodes may utilize a plurality of different document editing and viewing applications) as the centralized web-based XML editor provides the informational documents in a viewable/editable format that is rendered in the web browser of the client node. Therefore, the review platform may not be constrained by the formatting limitations of third party word processing or document viewing applications or programs.

Referring now to FIG. 1, an architectural diagram of an exemplary system for controlling review of a document is depicted. The system 100 is shown as including a cloud-based computing environment, hereinafter "cloud 105." According to some embodiments, the cloud 105 may include a plurality of interconnected web servers 110a-n.

Individual client nodes 115 are shown communicatively coupled with the cloud 105 via a network 120. It will be understood that the network 120 may include a private or public network such as the Internet.

In general, a cloud-based computing environment is a resource that typically combines the computational power of a large grouping of processors (such as within servers 110a-n) and/or that combines the storage capacity of a large grouping of computer memories or storage devices. For example, systems that provide a cloud resource may be utilized exclusively by their owners, such as Google® or Yahoo!®; or such systems may be accessible to outside users who deploy applications within the computing infrastructure to obtain the benefit of large computational or storage resources.

The cloud may be formed, for example, by a network of web servers 110a-n with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

In some embodiments, the cloud 105 may be configured to provide centralized and controlled environments for creating, modifying, and reviewing informational documents.

Figure 2:
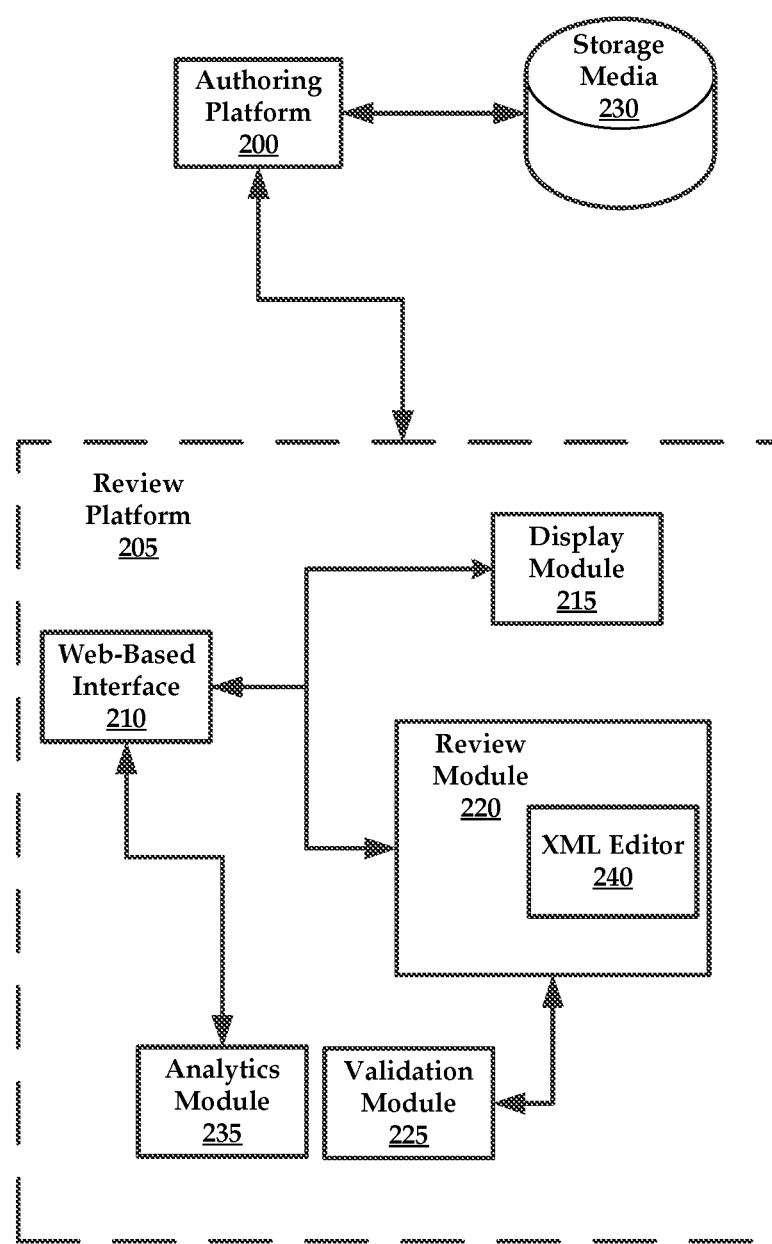
FIG. 2 illustrates an exemplary review platform resident within a cloud-based computing system.

FIG. 2 illustrates an exemplary an authoring platform 200 that is communicatively coupled with a review platform 205 of the cloud 105. In some embodiments, the review platform 205 may include a web-based interface 210, a display module 215, a review module 220, and a validation module 225.

It is noteworthy that the review platform 205 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality. In other embodiments, individual modules of the review platform 205 may include separately configured web servers.

The authoring platform 200 may provide an additional platform for document authors to manage, edit, and release content for publishing to the display module 215. As such, the authoring platform 200 may be communicatively coupled with a storage media 230 that receives and retains informational documents created by document authors.

It will be understood the informational documents stored within the storage media may have a read-only file access permission to prevent unwanted changes to the documents. Once documents are created and made available for review, content authors may notify document reviewers that one or more informational documents are available for review via electronic mail or other methods.

It is noteworthy that the timelines on which the reviews are opened and closed by content authors, and the type of document reviewer(s) who are allowed to perform various review functions may vary. For example, document authors may specify single day review periods, always open review periods, subject-matter experts from within engineering to the open community on the web, and so forth.

To review a document, document reviewers may communicatively couple to the review platform 205 via the web-based interface 210 utilizing a client node 115. The web-based interface 210 allows document reviewers to interact with and/or review informational documents. Document reviewers may select informational documents, or portions of informational documents to review via the web-based interface 210. Selecting informational content via the web-based interface 210 generates a request that is passed to the authoring platform 200.

The authoring platform 200 may then publish the informational document to the web-based interface via the display module 215. Next, the web browser of the client node 115 renders the source content of the informational document in a format that is perceivable to the document reviewer.

It is noteworthy that although the display module 215 and the review module 220 have been disclosed as being two separate modules, the inclusion of the web-based interface 210 ensures a tight integration of the functionalities of the two modules together. Therefore, when the document reviewer accesses a document via the web-based interface 210, the display module 215 and review module 220 work together in a seamless fashion to provide a review platform that resembles a conventional word processing application.

Additionally, the display module 215 may provide the document reviewer with powerful search capabilities. For example document reviewers may search for documents with simple searches to advance searches, or may search for specific content utilizing specific fields (e.g., image titles, and so forth). Additionally, the display module 215 may allow document authors to personalize their searches. For example, document reviewers may have the ability to filter down the searched documents based on a set of user-defined or otherwise provided criteria that allows the document reviewers to see only the documents they need.

Additionally, the display module 215 may function as a simple, easy-to-read, easy-to-navigate, and inter-linked search tool. In other embodiments, documents may be browsed by keywords, index terms, or other types of navigational structures. In some applications, the display module 215 may include graphic and media rich aids that make it easier for document reviewers to use, understand, and utilize the review platform 205.

The display module 215 receives the informational document from the authoring platform 200 in read-write access file permission such that modifications may be made to the informational document. Modifications to the document may be received by the review module 220 from input received via the web-based interface 210. According to some embodiments, the review module 220 may include an XML editor 240 that functions similarly to a word processing application. Document reviewers may utilize the XML editor 240 without need to learn the intricacies of the XML language or an appreciation of the XML structure or schema. Therefore, the informational content does not need to be converted into a suitable document format that may be different from the document format of the original informational document.

In some embodiments, the review module 220 may include a simple, easy-to-read, and easy-to-navigate modification form that appears substantially the same as the read-only version of the document. Similarly to the display module 215, the review module 220 (or XML editor 240) may include rich media and graphical aids that make it easier for an administrator or any other person tasked with configuring the system to understand and utilize the XML editor 240. Additionally, such individuals may be allowed to configure how the XML editor 240 behaves. For example, such individuals may configure the XML editor 240 such that hitting enter in a paragraph creates a new paragraph within the document. In another example, hitting enter in a list creates a new list item—but hitting enter twice may end the list and define the beginning of a new paragraph.

For example, if the original informational document is created in XML format, the system does not need to convert the XML format document into more commonly utilized document formats such as portable document format ("PDF"), document format ("DOC"), and so forth. Informational documents that are rendered by the web-based interface 210 may appear as a conventional word processing document instead of the more complicated and abstract native XML format that was utilized by the document author.

According to some embodiments, document reviewers may be provided document review templates that provide the document reviewer with a limited subset of review functionalities based upon the technical sophistication of individual document reviewers. For example, a document reviewer having very little knowledge of the technical aspects of XML content (such as, e.g., a marketing professional perhaps) may be provided with a very simplified XML editor that looks very similar to a word processing program. More sophisticated reviewers (such as, e.g., computer programmers) may be provided with a more technical and granular interface that allows the reviewer to comment or review pseudo-code, or even the underlying source code itself. As such, the web-based interface 210 may advantageously be tailored to the sophistication level of the end user.

Modifications made to the source content of the informational document via the XML editor 240 may be evaluated by a validation module 225 before the modifications are incorporated into the informational document. In some embodiments, the validation module 225 may apply a XSD schema to the modifications to determine if the modifications conform to the XSD schema. If the modifications do not conform to the XSD schema, they may be rejected. The review module 220 may generate a warning that is displayed to the document reviewer that the proposed modification does not conform to the XSD schema. One of ordinary skill in the art with the present disclosure before them will appreciate that many types of XML schema may likewise be utilized in accordance with the present technology.

Assuming the modifications conform to the XSD schema of the informational document, the modifications may be incorporated into the document to create a modified document. Once modifications have been incorporated into the original document, the modified document becomes the original document for purposes of a subsequent review. That is, the modified document may take the place of the original document. This process may happen iteratively as the document is further reviewed and modified over time.

In some embodiments the modifications may be saved temporarily as tentative changes. These tentative changes may be represented in a visually distinct manner relative to the original source content of the informational document. For example, the modifications may be underlined or colored such that they may be quickly and easily visually apprehended by a document reviewer. Tentative changes may be incorporated into the document upon approval, as discussed in greater detail herein.

In other embodiments, modifications are incorporated without further review. As such, upon a modification being incorporated into the document, the display module 215 may provide or "publish" the updated document to the web-based interface 210 such that the document reviewer may immediately or instantaneously review the modification. This instantaneous, or essentially instantaneous, feedback provides the document reviewer with a visual representation of the incorporation of a modification to the informational document. As such, the document reviewer may more easily appreciate the effect of a particular modification on the final published appearance of the informational document by reviewing the feedback.

It is envisioned that the document author may provide an informational document to a plurality of document reviewers. The document reviewers may collaboratively review the document, each independently (or collaboratively) providing modifications or commentary relative to the informational document.

In some applications, document reviewers may be the actual document consumer or end user. Document authors may publish the informational document for review by a plurality of end users in a collaborative review process that is often referred to as "crowdsourcing." Rather than (or in addition to) utilizing resources within a company to review technical or informational documents, content authors may enlist the expertise of their customers to refine and improve the informational documents of the company. Because the end user may utilize the web-based interface 210 to provide commentary or review an informational document, web analytics may be gathered from the client device of the end user that communicatively couples with the web-based interface 210. These web analytics may be utilized to help the company or other entity to understand the demographics or interest of their end users, providing additional benefit to both the end user and the company or entity. Web analytics may be aggregated and evaluated according to methods such as those disclosed in a corresponding U.S. patent application Ser. No. 13/037,273 filed on Feb. 28, 2011 and titled "Systems, Methods, and Media for Generating Analytical Data," which is hereby incorporated herein by reference in its entirety including all references cited therein.

The web-based interface 210 may receive modifications from each of the plurality of document reviewers and may incorporate modifications to the document in different colors. Each color may be associated with a different document reviewer. Additionally, document reviewers may critique or comment on the modifications of other document reviewers. It will be understood that these types of review processes may be utilized to determine inconsistencies in informational documents, or may be utilized as a quality control process.

In some exemplary embodiments, consensus regarding modifications may be obtained from the plurality of document reviewers before the modifications may be incorporated into the document. In some instances, a subset of document reviewers may be utilized to filter or approve modifications. In other embodiments, document reviewers may be permitted to vote on the appropriateness of a modification before incorporation of the same into the document to create a modified document.

In short, the review platform 205 may provide mechanisms for dynamic document review processes that are controlled (only allowing a document to have its file access permission changed to read-write upon request from an approved document reviewer) and allows for collaborative review.

In other embodiments, document authors may approve or reject modifications to the document. In these embodiments, the document author may utilize the web-based interface 210 and select one or more of the modifications. The document author may accept or reject the modifications. Accepted modifications may be incorporated into the document to create a modified document.

It will be understood that document reviewers may be granted privileges within the review platform 205 by the system administrators and/or document authors. These privileges may be determined by department (document authors v. engineers) or as a document review project moves through different stages. For example, such stages may include "open review" stages where engineers modify the source content, and "closed review" stages where only document authors may review and/or modify informational documents.

In some embodiments, the review platform 205 may include an analytics module 235 that may track the behavior of document reviewers to determine metrics such as informational documents with the highest number of modifications (connotes poorly authored documents or confusing source content), what types of modifications are being made to documents, how different communities of document reviewers modify documents, and so forth. Reports or other statistical data may be provided to content authors via the analytics module 235.

As stated previously, the review platform 205 may be adapted to associate modifications or commentary with individual document reviewers. As such, by clicking on (or otherwise selecting) the modification or comment, a document author (or other document reviewer) may determine information corresponding to the individual (or individuals) that provided the comment or modification. The information corresponding to the individual may include a name, an email address, social media identification, or other identifying information that allows the individual document reviewer to be contacted directly for more immediate feedback. Individual comments or modifications may be tagged with information that corresponds to the document reviewer that provided the commentary or modification.

In some applications, the review module 205 may be configured to retain a breadcrumb trail, thread, or other similar comment artifact of each change made to the informational document, or commentary relating to the document. An exemplary breadcrumb trail may include a navigation aid that visually portrays iterations of the document. For example, the dates of modifications may be listed in chronological order with a glyph (symbol) between adjacent dates. Historical information may assist the document author in creating documents that are more closely aligned with the interests or desires of the document consumer.

Document authors or document reviewers may be allowed to close individual comment threads or feedback loops to resolve particular issues relative to a document. As such, the analytics module 235 of the review platform 205 may also monitor the status of review, commentary, or critiques of documents to determine outstanding issues relative to a document (e.g., issues that have not been closed). For example, several document reviewers may have questioned the use of a particular phrase within a document. In some illustrative embodiments, if the content author has not responded to the commentary, it may be assumed that the document reviewer is not considering the commentary, or is not responding to issues in a timely manner. According to some embodiments, the analytics module 235 may generate graphs or charts of issues or critiques that have been opened, closed, reviewed, and so forth, within a particular period of time.

In summation, the flow of data begins when a request for a document is received by the review platform, namely by the display module 215. Documents corresponding to the request are obtained from the authoring platform 200 by the display module 215. Before the documents are communicated from the authoring platform 200 to the display module 215, the authoring platform 200 converts the document from read-only file access permission to read-write access file permission.

The display module communicates the document to the review platform 220. Modifications are received by, and incorporated into the document via the review platform 220. To be sure, modifications may include edits, comments, changes, or other similar data. The review platform 220 updates the document with the modifications to create a modified document. The review platform 220 then communicates the modified document back to the display module 215 where the modified document may be provided in a displayable format or communicated back to the authoring platform 200.

After receiving the modified document from the display module 215, the authoring platform 200 then converts the modified document back to read-only file access permission before storing in a storage media.

Figure 3:
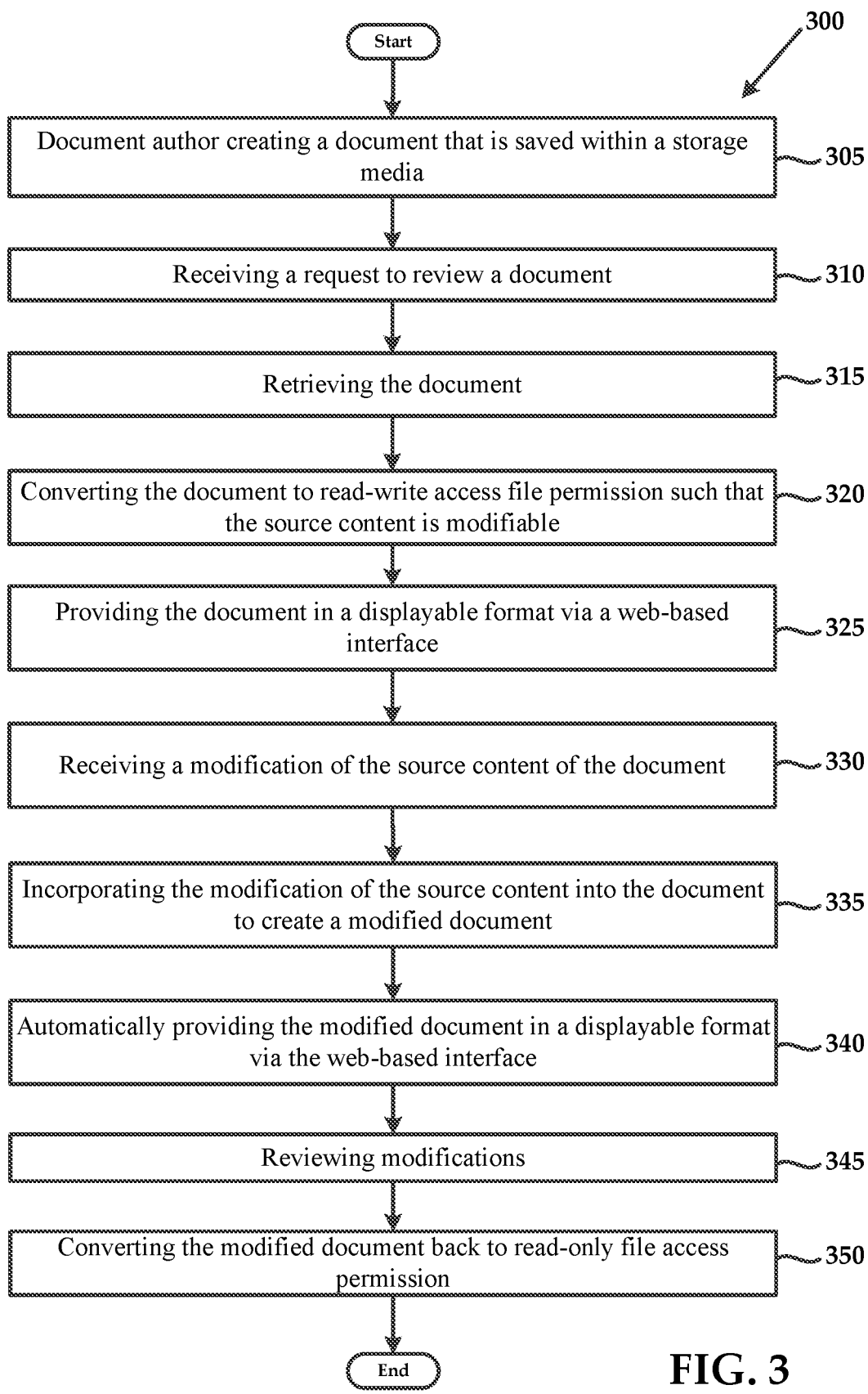
FIG. 3 is an exemplary flowchart of a method for controlling the review of a document.

In keeping with some embodiments according to the present technology, FIG. 3 illustrates a flowchart of an exemplary method 300 for controlling the review of a document. The method 300 may begin with a step 305 of a document author creating a document that is saved within a storage media. It will be understood that the document may be saved having a read-only file access permission to prevent unwanted changes to the document. It will further be understood that the document has a XML format, in this example, and includes source content that defines the subject matter of the document. Moreover, the document remains in XML format during each step of the method from storage to display to modification and finally back to storage. As such, this exemplary method advantageously allows for review and modification of documents without the need to convert the document into discrepant formats.

The method may include the step 310 of receiving a request to review a document from a client node via the web-based interface. The request may be generated from a document reviewer selecting a document, or a portion of a document.

Next, responsive to the request, the method may include the step 315 of retrieving the document from the storage media. It is noteworthy that the storage media may be communicatively coupled with (or reside within) a cloud-based computing system.

After retrieval, the method may include the step 320 of converting the document to read-write access file permission such that the source content is modifiable, along with a step 325 of providing the document in a displayable format via a web-based interface.

The converting of the document to read-write access file permission functions similarly to opening a document in a word processing application, in some embodiments. Advantageously, the document reviewer may comment, edit, delete, add, or otherwise modify the source content of the document all without the need to understand the intricacies and code structure of the XML document format.

If the document reviewer modifies the document, the method may include a step 330 of receiving a modification of the source content of the document and a step 335 of incorporating the modification of the source content into the document to create a modified document.

Because the platform provided herein may utilize WYSIWYG processes for document review, the method 300 may include the step 340 of automatically providing the modified document in a displayable format via the web-based interface. Feedback or modifications to the document are made immediately available to the document reviewer. In some methods, modifications may be displayed in a visually distinct format by underlining and/or coloring the modifications to delineate them from the original source content of the document.

According to some embodiments, the method 300 may include a step 345 of reviewing modifications before the modified or reviewed document is converted back to read-only file access permission. The step 345 of reviewing modifications may be performed by the original document author, the document reviewer, a plurality of document reviewers, or via crowdsourcing. Reviewing modifications may include approving or rejecting modifications to the document, in whole or in part. It will be understood that the step 345 of reviewing modifications may occur before the step 335 of incorporating the modification of the source content into the document to create a modified document.

Once the modified document has been reviewed the method 300 may include a step 350 of converting the modified document back to read-only file access permission. The modified document may again be stored in the storage media associated with the cloud-based computing system.

Figure 4:
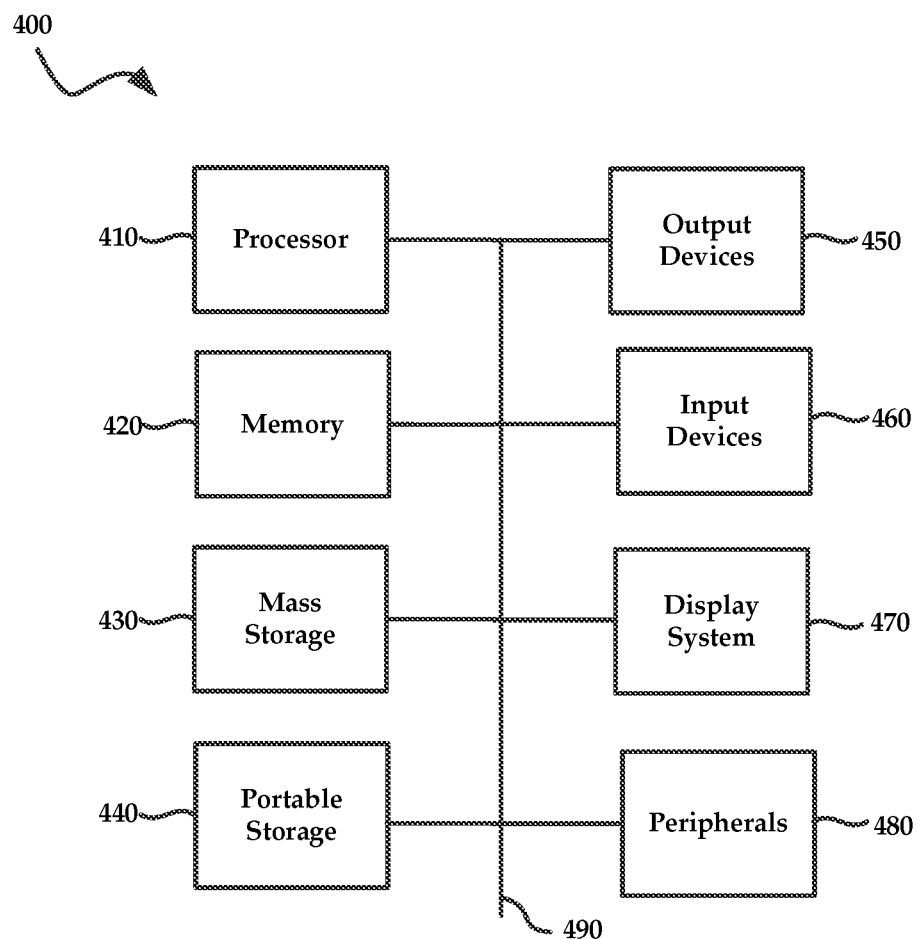
FIG. 4 is a block diagram of an exemplary computing system that may be utilized to practice aspects of the present disclosure.

FIG. 4 illustrates an exemplary computing system 400 that may be used to implement an embodiment of the present technology. The computing system 400 of FIG. 4 includes one or more processors 410 and main memory 420. Main memory 420 stores, in part, instructions and data for execution by processor 410. Main memory 420 can store the executable code when the system 400 is in operation. The system 400 of FIG. 4 may further include a mass storage device 430, portable storage 440, output devices 450, user input devices 460, a graphics display 440, and other peripherals 480.

The components shown in FIG. 4 are depicted as being connected via a single bus 490. The components may be connected through one or more data transport means. Processor 410 and main memory 420 may be connected via a local microprocessor bus, and the mass storage device 430, peripherals 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor 410. Mass storage device 430 can store the system software for implementing embodiments of the present technology for purposes of loading that software into main memory 420.

Portable storage device 440 operates in conjunction with a portable non-volatile storage media, such as a floppy disk, compact disk or Digital Video Disc, to input and output data and code to and from the computing system 400 of FIG. 4. The system software for implementing embodiments of the present technology may be stored on such a portable media and input to the computer system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripherals 480 may include a modem or a router.

The components contained in the computer system 400 of FIG. 4 are those typically found in computer systems that may be suitable for use with embodiments of the present technology and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage media" and "computer-readable storage media" as used herein refer to any media or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disc (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for controlling collaborative review of a document between a plurality of document reviewers, the method comprising:
receiving from the plurality of document reviewers tentative modifications of the source content of the document, each of the document reviewers using a document editor that executes within a browser of a computing system of the document reviewer, the source content being converted for display within the document editor;
applying, by the document editor, an XML schema definition (XSD) to the source content;
comparing the tentative modifications to the XSD for consistency of formatting, and rejecting the tentative modifications if non-conforming with the XSD;
displaying a warning message if the tentative modifications are non-conforming;
displaying the tentative modifications of the source content within the document;
transmitting the tentative modifications to a plurality of client nodes;
receiving crowdsourced feedback to the tentative modifications from the plurality of client nodes; and
incorporating the tentative modifications of the source content into the document based on the crowdsourced feedback to create a modified document, the modified document being displayed via a web-based interface.

2. The method according to claim 1, further comprising:
receiving a request to review the document via a web-based interface:
responsive to the request, retrieving the document, the document having a read-only access file permission; and
converting the document to read-write access file permission such that the source content is modifiable.

3. The method according to claim 1, further comprising automatically providing the modified document in a displayable format to a web-based interface, after the step of incorporating.

4. The method according to claim 2, wherein providing the document in a displayable format includes publishing the document as a web page accessible via a web-based interface.

5. The method according to claim 1, wherein the tentative modifications of the source content are received via a web-based extensible markup language editor associated with the web-based interface.

6. The method according to claim 1, further comprising displaying the modification of the source content of the document as tentative changes until receiving permission to incorporate the modification, the tentative changes being visually distinctive from the source content.

7. The method according to claim 6, wherein receiving permission includes:
receiving feedback from a plurality of client nodes responsive to transmission of the tentative modifications of the source content of the document; and
at least one of approving and rejecting incorporation of the modification of the source content into the document based upon the feedback.

8. The method according to claim 1, further comprising validating the received modification before the step of incorporating.

9. The method according to claim 8, wherein validating includes applying an extensible markup language schema definition to the modification and rejecting the modification if the modification does not conform to the extensible markup language schema definition.

10. The method according to claim 2, further comprising converting the modified document back to read-only access file permission and storing the modified document in a storage media.

11. A system for controlling review of a document, the system comprising:
a memory for storing executable instructions for controlling review of the document; and
a processor configured to execute the instructions, the instructions including:
a display module that:
provides source content of the document to a plurality of document reviewers, each document reviewer using a document editor that executes within a web-based interface of a browser of a computing system of the document reviewer, the source content being converted for display within the document editor, the document editor applying an XML schema definition (XSD) to the source content; and
applies a different document review template to the document for each of the plurality of document reviewers, wherein a document review template comprises a limited subset of review functionalities based upon the technical sophistication of a document reviewer; and
the display module communicatively coupled with a review module for performing an iterative document review process that:
receives tentative modifications of the source content of the document from the plurality of document reviewers;
applies the XSD schema to the tentative modifications to reject modifications that do not conform to the XSD schema, and a warning message being displayed if the modified document is non-conforming;
displays the tentative modifications to the document to the plurality of document reviewers via a web based interface, wherein the displayed tentative modifications from each of the plurality of document reviewers are visually distinct so as to identify a respective one of the plurality of document reviewers;
receives crowdsourced feedback to the tentative modifications from the plurality of document reviewers;
creates a modified document based on the crowdsourced feedback to the tentative modifications, and
iterates the document review process on the modified document.

12. The system according to claim 11, further comprising an authoring platform that publishes the document to the display module communicatively coupled to the authoring platform, the display module providing the source content as a web page via a web-based interface.

13. The system according to claim 12, wherein the authoring platform is communicatively coupled with the review module, and the authoring platform receives the modified document from the review module and converts the modified document to read-only file permission.

14. The system according to claim 13, wherein the authoring platform stores the modified document in a storage media communicatively coupled with the authoring platform.

15. The system according to claim 11, wherein the display module provides the modified document to the web-based interface as a web page.

16. The system according to claim 11, wherein the review module further comprises a web-based extensible markup language editor.

17. The system according to claim 16, wherein the web-based extensible markup language editor receives modification of the source content from at least one of a plurality of client nodes via the web-based interface, wherein the web-based extensible markup language editor is associated with the web-based interface.

18. The system according to claim 17, wherein the review module saves the modification of the source content of the document as tentative changes until the review module receives permission to incorporate the modification from at least one of the plurality of client nodes, the tentative changes being visually distinctive from the source content.

19. The system according to claim 18, wherein the review module (a) receives feedback from a plurality of client nodes responsive to receiving modification of the source content of the document; and (b) at least one of permits and rejects incorporation of the modification of the source content into the document based upon the feedback.

20. The system according to claim 11, wherein the review module further includes a validation module that validates the received modification before the review module incorporates the modification into the document.

21. The system according to claim 20, wherein the validation module applies an extensible markup language schema definition to the modification and rejects the modification if the modification does not conform to the extensible markup language schema definition.

22. The system according to claim 11, wherein the review module retains a breadcrumb trail that includes a navigation aid that visually portrays iterations of the document modifications.

23. A non-transitory computer readable storage media having a computer program embodied thereon, the computer program executable by a processor in a computing system to perform a method for controlling review of a document, the method comprising:

for each of a plurality of document reviewers:
applying a document review template to the document, the document review template comprising a limited subset of review functionalities based upon the technical sophistication of a document reviewer of the plurality of document reviewers;
receiving a modification of the source content of the document;
applying, by a document editor, an XML schema definition (XSD) to the received modifications to determine consistency and formatting, and rejecting the modifications that are non-conforming with the XSD;
transmitting the modifications to a plurality of client nodes;
receiving crowdsourced feedback to the modifications from the plurality of client nodes;
creating a modified document based on the modifications and the crowdsourced feedback, the modified document being displayed via a web-based interface; and
providing the modified document in a displayable format for publishing the document as a web page accessible via the web-based interface.

* * * * *